United States Patent [19]

Silbermann et al.

[11] Patent Number: 4,792,465

[45] Date of Patent: Dec. 20, 1988

[54] PROCESS FOR MAKING SURFACE MODIFIED U.V. STABILIZED PVC ARTICLES

[75] Inventors: Joseph Silbermann, Old Bridge; Michael T. Burchill, Cranbury, both of N.J.

[73] Assignee: M&T Chemicals Inc., Woodbridge, N.J.

[21] Appl. No.: 76,648

[22] Filed: Jul. 23, 1987

Related U.S. Application Data

[63] Continuation-in-part of Ser. No. 945,595, Dec. 23, 1986.

[51] Int. Cl.$^4$ .............................................. B05D 3/00
[52] U.S. Cl. .................................. 427/160; 427/336; 427/352; 427/353
[58] Field of Search ............... 427/160, 336, 352, 353

[56] References Cited

U.S. PATENT DOCUMENTS

| | | | |
|---|---|---|---|
| 2,920,978 | 1/1960 | Randall | 427/160 |
| 3,297,462 | 1/1967 | Fanning | 427/160 |
| 3,519,462 | 7/1970 | Bristol | 427/160 |

*Primary Examiner*—Janyce Bell
*Attorney, Agent, or Firm*—S. A. Marcus; W. Katz

[57] ABSTRACT

What is described herein is a process of making a U.V. stabilized PVC article wherein the surface region of the article is modified with a U.V. stabilizer and the treated surface is substantially free of residual stabilizer thereon. The process includes the steps of (a) applying a solution of a U.V. stabilizer in a solvent which is capable of swelling the PVC but is otherwise non-aggressive thereto, and (b) displacing residual solution remaining on said thus treated surface by a liquid which is non-miscible with said solvent.

In the preferred form of the invention, step (b) is carried out by contacting the treated surface with water to cause physical removal of the residual solution out of its position on the treated surface, such as by agitation, a jet stream, ultrasonics, and the like.

8 Claims, No Drawings

PROCESS FOR MAKING SURFACE MODIFIED U.V. STABILIZED PVC ARTICLES

CROSS-REFERENCE TO RELATED PATENT APPLICATION

This application is a continuation-in-part of copending patent application Ser. No. 945,595, filed 12/23/86, by the same inventors, and assigned to the same assignee, as herein.

BACKGROUND OF THE INVENTION

1. Field of the Invention

This invention relates to U.V. stabilized PVC articles, and, more particularly to an improved process of making surface modified, U.V. stabilized PVC articles having a high quality surface appearance.

2. Description of the Prior Art

Photodegradation of many types of solid polymeric articles by U.V. light has been a continual problem confronting the industry. Such U.V. degradation causes discoloration, embrittlement and deterioration of the article. Accordingly, U.V. absorber compounds have been incorporated into such polymeric articles in an attempt to provide effective stabilization to U.V. light.

However, since photodegradation is known to be a surface phenomenon, such incorporation of U.V. stabilizers into the polymeric material prior to shaping into solid form has been largely uneconomical and inefficient because the stabilizer is present substantially in the interior of the shaped article, where it does not function effectively to prevent surface photodegradation.

Accordingly, surface treatments have been proposed to provide more effective U.V. protection for such resins. These treatments are based on the ability of various organic solvents to swell such resins as polyvinyl chloride. This swelling property enables the ultraviolet light stabilizer material to be directed principally into the surface region of the resin body. However, none of these surface treatments has been very successful commercially. Another surface method comprises laminating the surface of the polymer with a layer of a film-forming material containing the U.V. stabilizer. This lamination approach, unfortunately, suffers from the problems of incompatibilities between polymer, U.V. stabilizer, and the film-forming material and its carrier components. Furthermore, the laminated layer and the surface of the polymer do not adhere well, and delamination upon shock or impact is a serious problem.

The swelling method is described by Katz, et al. in two articles appearing in the "Proceedings of the A.C.S Div. of Org. Coatings and Plastics" 36, (1) p. 202-205 (1976), entitled "Ultraviolet Protection of Transparent PVC by Diffusion Coatings" and in Soc. Plast. Eng., Technical Papers (1976) 22, p. 511-512. Katz uses a dip method to impregnate a transparent PVC sheet to a given depth with a nonmigrating ultraviolet light absorber. The dip technique comprises swelling the polymer with a carrier solvent, infusing the stabilizer from a solution thereof with the carrier, and, thereafter heating the treated polymer in air at an elevated temperature to drive the stabilizer below the surface of the polymer and to remove residual solvent. Under these process conditions, however, only a small amount of stabilizer is absorbed into the surface region, and residual stabilizer can remain on the treated surface.

Jochanan, in Israeli Pat. No. 39037, published Nov. 10, 1975, entitled "U.V.-and Oxidation-Proof Products from Organic Plastics and their Manufacture", describes various methods of applying a solution or suspension of an ultraviolet light absorber to the surface of a plastic sheet and air drying to remove solvent. The methods disclosed by Jochanan include immersion, spraying, brushing, rollerprinting and curtain-coating. However, with such methods, a large amount of residual stabilizer and solvent is left on the surface of the article, whereupon the modified surface is observed to be streaky, hazy, and has runs or pockmarks thereon.

Humphrey, in U.S. Pat. No. 4,146,658, describes a process for producing an ultraviolet light stabilized polycarbonate article by dipping the polycarbonate sheet into a impregnating solution consisting of a selected combination of ultraviolet absorber and solvent and evaporating the solvent.

Ching, in U.S. Pat. No. 4,349,607, describes the incorporation of certain U.V. stabilizers into thermoplastic resins by dipping, spraying and brushing followed by heating at 70° C.

Amborski, in U.S. Pat. No. 3,043,709, discloses an organic polymeric article article having an ultraviolet light absorber compound incorporated adjacent to the surface of the article. The article is treated by several methods, including dipping-coating a polyvinyl chloride film in a stabilizer solution, and heating in air at 130° C. to drive the absorber below the surface of the film and to remove the solvent. These processes, however, are disadvantageous because they form an article in which considerable residual absorber is present on both sides of the film, which affects its surface perfection and appearance.

Fanning, in U.S. Pat. No. 3,297,462, discloses a process for rendering polymeric films resistant to the deteriorating effects of sunlight by immersing them in a solution of a benzophenone stabilizer in a solvent mixture of diethylene glycol and glycerol, and then washing successively in diethylene glycol, at elevated temperatures, and then water. The polymers suitable for such treatment, however, must have a zero strength temperature of at least 200° C., which excludes many useful polymers, including polyvinyl chloride.

Solvay and Cie, in Belgium Pat. No. 612,206, discloses a process for surface treating rigid polyvinyl chloride objects. The method comprises immersing the object in a swelling solvent containing a light stabilizer and then evaporating the solvent in air. This procedure, however, is ineffective because some stabilizer remains on the treated surface of the object, which gives a poor physical appearance, and, furthermore environmental hazards are created during removal of the solvent in air.

Cohnen, in U.S. Pat. No. 3,892,889, describes a method of applying a solution of a U.V. stabilizer to polycarbonate resin sheets and drying in air.

Chilton, in U.S. Pat. No. 4,323,597, teaches a flow-coating process for polycarbonate articles. In this process, the surface of the polycarbonate is heated and a liquid stabilizer composition, which is non-aggressive towards but wets the polycarbonate surface, is flowed over the heated surface. There is no indication in this patent, however, that the method is applicable to polyvinyl chloride.

Bristol, in U.S. Pat. No. 3,519,462, describes the treatment of heated polyvinyl chloride and other polymers with a solution of a U.V. stabilizer in a diol or triol. These solvents, however, are not efficient swelling agents for PVC. Furthermore, there is no indication therein of a suitable method for removing excess stabilizer solution present on the treated surface.

Lempkowicz et al, in U.S. 4,126,660 describes a process for the manufacture of oriented sheets of PVC which are surface modified with U.V. stabilizer by applying a solution of the stabilizer in a defined mixture of high boiling swellable solvents, at elevated temperatures, and thereafter evaporating the solvent from the treated surface.

In summary, these and other processes have not provided useful U.V. stabilized articles, particularly polyvinyl chloride resin articles, for example, for residential siding, which use requires particularly effective protection from the weathering effects of sunlight, and an appearance and degree of surface perfection which is acceptable in commercial use.

There is a present need to provide a method for effectively modifying the exposed surface of a PVC sheet, such as residential siding, with a U.V. stabilizer, such that the modified surface of the sheet is substantially free of residual stabilizer and solvent material.

It is an object of this invention to provide a method of making a surface modified, U.V. stabilized PVC resin sheet article wherein the surface region is modified with a U.V. stabilizer and the treated surface is substantially free of residual stabilizer and solvent material.

SUMMARY OF THE INVENTION

What is described herein is a process of making a U.V. stabilized PVC article wherein the surface region of the article is modified with a U.V. stabilizer and the treated surface is substantially free of residual stabilizer thereon. The process includes the steps of (a) applying a solution of a U.V. stabilizer in a solvent which is capable of swelling the PVC but is otherwise non-aggressive thereto, and (b) displacing residual solution remaining on said thus treated surface by a liquid which is non-miscible with said solvent.

In the preferred form of the invention, step (b) is carried out by contacting the treated surface with water to cause physical removal of the residual solution out of its position on the treated surface, such as by agitation, a jet stream, ultrasonics, and the like.

DETAILED DESCRIPTION OF THE INVENTION

Application Step (a)

According to the present process, the UV stabilizer-containing solvent medium is maintained in contact with the surface of the PVC-containing article for a period of time and at a temperature sufficient to permit the UV stabilizer to effectively (i.e. to provide the desired UV protection) impregnate the surface layer of the article but insufficient to deteriorate its physical properties. Such period of time may range from about 2 seconds to 5 minutes. The temperature of the UV stabilizer-containing medium during such contact time is preferably at ambient or room temperatures. Increasing temperatures and/or treatment periods generally provide an increasing amount and depth of UV stabilizer penetration into the surface of the PVC-containing article. In an immersion or dipping technique, all surfaces of the article will be treated, in contrast to other techniques such as in the two-layer process of the aforementioned copending application, in which a liquid film of the UV stabilizer-containing medium is deposited on one or less than all such surfaces and permitted to remain in contact therewith for the necessary period of contact time.

Displacing Step (b)

Following treatment of the said article as described above, excess stabilizer solution remaining on the surface of the treated article is displaced therefrom by a liquid which is non-miscible with said solvent. The displacing step may be carried out at the treatment temperatures indicated above, or at any other desired temperature. Ambient temperatures or below is preferred. Displacement is carried out for an effective duration which may range from a few seconds to a few minutes e.g. 5 seconds to 5 minutes. A preferred displacing medium is a jet stream of water, agitated water, or water under the influence of ultrasonic energy.

The resultant product then can be dried to remove water in any desired manner but preferably at no more than the maximum treatment temperatures referred to above. Higher temperatures may be employed for very short durations to avoid damaging the surface of the article.

Displacement of residual treatment solution from the surface of the PVC article by displacement as described above instead of by evaporation is surprisingly effective and advantageous. Removal by evaporation is a relatively lengthy procedure whereas displacement effects such removal rapidly. Furthermore, the prescribed displacement step of the process of this invention also eliminates all the disadvantages of removal by vaporization referred to hereinbefore in the discussion of the processes disclosed in the aforementioned prior art. In particular, the displacement step herein provides a product in which the treated surface is substantially free of residual stabilizer thereon, thus presenting a clean surface appearance which is decidedly avantageous in commercial use in residential siding articles, for example, where appearance is of particular importance.

Maximum effectiveness and economy in using the UV stabilizer herein calls for maximum concentration thereof in the surface region of the PVC article, i.e. to a depth of up to about 200 microns. The preferred surface region in which the UV stabilizer is one in which at 70% of the stabilizer is concentrated in the first 100 microns. Optimum amount and depth of penetration of the UV stabilizer into the surface region of the PVC article is achieved by suitable control, for any particular UV stabilizer, solvent and PVC article, or treatment time, temperature of treatment, and concentration of UV stabilizer in the treatment solution, with which such amount and depth of penetration vary directly.

The shaped resin body itself is obtained by general mechanical processing techniques known to those skilled in the art. Illustrative of such mechanical operations are compression, injection, jet, transfer molding, vacuum forming, extrusion and the like. Such bodies can range from flexible sheets to rigid structural members. However, the invention is aimed particularly at articles which are plagued by UV degradation accompanying outdoor weathering, and, particularly, PVC residential siding.

The resin article itself may be transparent, translucent, opaque or pigmented.

Organic solvents suitable for use herein include, halogenated hydrocarbons having up to six, preferably three, carbon atoms in the chain; ketones, both aliphatic and cycloaliphatic; aliphatic esters, ethers and the like. Representative halogenated hydrocarbons include methylene chloride, chloroform, 1,2-dichloroethane, 2-chloro-2-methylpropane and like chlorinated hydrocarbons. Exemplary ketones are 2-pentanone, 3-pentanone, 2-hexanone, 2,4-pentanedione and the like. Suitable ethers include diethyl ether, dipropyl ether, dimethoxy ethane, furan, tetrahydropyran and the like. Mixtures of mutually miscible organic solvents can be used. The preferred organic solvents are methylene chloride, 1,2-dichloroethane, ethyl acetate, 2-pentanone and 3-pentanone, and mixtures of these solvents.

Suitable U.V. stabilizers include the following commercially available materials:

Cyasorb U.V. 9: 2-hydroxy-4-methoxybenzophenone (Trademark of American Cyanamid)
Cyasorb U.V. 531: 2-hydroxy-4-n-octoxybenzophenone (Trademark of American Cyanamid)
Cyasorb U.V. 5411: 2(2'-hydroxy-5'-t-octylphenyl)benzotriazole (Trademark of American Cyanamid)
Tinuvin P: 2(2'hydroxy-5'-methylphenyl)benzotriazole (Trademark of Ciba-Geigy)
Tinuvin 326: 2-(3't-butyl-2'-hydroxy-5'-methylphenyl)-5-chlorobenzotriazole (Trademark of Ciba-Geigy)
Sanduvor VSU: 2-ethyl-2-ethoxyanilide (Trademark of Sandoz Corp.)
Tinuvin 144 and 770: hindered amine light stabilizers (Trademark of Ciba Geigy for HALS)
Irgastab 2002: a nickel phosphate (Trademark of Ciba-Geigy)

The following is a partial list of these and other benzophenones and triazoles which are suitable U.V. stabilizers for use herein, although salicylates, formanidines and benzoates may be used as well.

2,2'-dihydroxybenzphenone
2,2,4,4'-tetrahydroxybenzophenone
2,2'-dihydroxy-4,4'-dimethoxybenzophenone
2,2'-dihydroxy-4,4'-diethoxybenzophenone
2,2'-dihydroxy-4,4'-dipropoxybenzophenone
2,2'-dihydroxy-4,4'-dibutoxybenzophenone
2,2'-dihydroxy-4-methoxy-4'-ethoxybenzophenone
2,2'-dihydroxy-4-methoxy-4'-propoxybenzophenone
2-hydroxy-4,4',5'-trimethoxybenzophenone
2-hydroxy-4-ethoxy-4'-methylbenzophenone
2-hydroxy-4-ethoxy-4'-ethylbenzophenone
2-hydroxy-4-ethoxy-4'-propylbenzophenone
2-hydroxy-4-ethoxy-4'-methoxybenzophenone
2-hydroxy-4,4-diethoxybenzophenone
2-hydroxy-4-ethoxy-4'-propoxybenzophenone
2-hydroxy-4-ethoxy-4'-butoxybenzophenone
2-hydroxy-4-ethoxy-4'-chlorobenzophenone
2-hydroxy-4-ethoxy-4; -bromobenzophenone
2-(2'-hydroxy-5'-methylphenyl)benzotriazole
2-(2'-hydroxy-5'-t-butylphenyl)benzotriazole
2-(2'-hydroxy-3'-methyl-5-t'-butylphenyl)benzotriazole
2-(2'-hydroxy-5'-cyclohexylphenyl)benzotriazole
2-(2'-hydroxy-3',5'-dimethylphenyl)benzotriazole
2-(2'-hydroxy-5'-t-butylphenyl)-5-chlorobenzotriazole and
2-(2'-hydroxy-3'-di-t-butylphenyl)benzotriazole
2,2'-dihydroxy-4-methoxy-4'-butoxybenzophenone
2,2'-dihydroxy-4-ethoxy-4'-propoxybenzophenone
2,3'-dihydroxy-4,4'-dimethoxybenzophenone
2,3'-dihydroxy-4-methoxy-4'-butoxybenzophenone
2,3'-dihydroxy-4,4,5-trimethoxybenzophenone
2-hydroxy-4,4,5'-trimethoxybenzophenone
2-hydroxy-4,4,6,'-tributoxybenzophenone
2-hydroxy-4-ethoxy-2,4'-dibutylbenzophenone
2-hydroxy-4-propoxy-4,6'-dichlorobenzophenone
2-hydroxy-4-propoxy-4',6'-dibromobenzophenone
2,4-dihydroxybenzophenone
2-hydroxy-4-methoxybenzophenone
2-hydroxy-4-ethoxybenzophenone
2-hydroxy-4-propoxybenzophenone
2-hydroxy-4-butoxybenzophenone
2-hydroxy-4-methoxy-4'-methylbenzophenone
2-hydroxy-4-methoxy-4'-propylbenzophenone
2-hydroxy-4-methoxy-4'-butylbenzophenone
2-hydroxy-4-methoxy-4'-t-butylbenzophenone
2-hydroxy-4-methoxy-4'-chlorobenzophenone
2-hydroxy-4-methoxy-2'-chlorobenzophenone
2-hydroxy-4-methoxy-4'-bromobenzophenone
2-hydroxy-4,4'-dimethoxybenzophenone
2-hydroxy-4,4'-dimethoxy-3-methylbenzophenone
2-hydroxy-4,4'-dimethoxy-3-methylbenzophenone
2-hydroxy-4,4'-2'-ethylbenzophenone
2-hydroxy-acetophenone The preferred temperature for making the U.V. stabilized article of the present invention is ambient temperature. However, process temperatures lower and higher than ambient temperature may be used, if desired. It may be advantageous to use process temperatures higher than ambient temperature for such solvents. Similarly, organic solvents which swell a particular resin only modestly at room temperature can be rendered quite effective for infusion of the requisite amount of stabilizer into the surface region of the resin by raising the treatment temperature.

The invention is applicable also to resin article impregnated with additives other the U.V. stabilizers. For example, resins can be impregnated with such additives as anti-static agents, anti-oxidants, anti-block agents, dyes, slip additives, and the like.

EXAMPLE 1

PVC sheets (samples) containing 0–6 phr or PHR (parts per hundred) of $TiO_2$ are immersed for varying periods of time in 5 wt. vol. % solutions of various stabilizers in methylene chloride, followed immediately by displacing at ambient temperatures for about 10–40 seconds with agitated water. The results show that the—YI values are about 5 or less after 10 days weathering under accelerated weathering tests. Substantially no stabilizer is found on the surface of the treated PVC sheets and its appearance is substantially indistinguishable from an untreated surface.

EXAMPLE 2

The procedure of Example 1 is repeated except that the water is not agitated. Stabilizer solution is found to remain on the surface of the treated PVC sheet and the PVC has a mottled, white surface appearance, which cannot be removed even by wiping.

EXAMPLE 3

Although the invention has been described in its preferred forms with a certain degree of particularity, it is understood that the present disclosure has been made only by way of example and that numerous changes can be made without departing from the spirit and the scope of this invention.

A solution of 7.5% by weight of Cyasorb U.V. 5411 stabilizer (Trademark of American Cyanamid Co.) in methylene chloride was applied to the upper surface of a horizontally supported, moving PVC strip immersed in water at 25° C. The applicator nozzles were directed vertically downward toward the upper surface of the strip from a position beneath the surface of the water layer. Thereupon stabilizer was absorbed into the surface region of the strip and excess solution fell to the bottom of the tank. The contact time was 24 seconds. Downstream of the application zone, a jet of water was applied to the treated surface to displace residual solution remaining on the surface of the strip. The thus-treated strip then exited the tank and was wound onto a take-up roll.

We claim:

1. A process of making a U.V. stabilized PVC article wherein the surface region of the article is modified with a U.V. stabilizer and the treated surface is substantially free of residual stabilizer thereon, which comprises the steps of:
   (a) applying a solution of a U.V. stabilizer in a solvent which is capable of swelling said PVC but is otherwise non-aggressive thereto, and,
   (b) displacing residual stabilizer solution present on said thus-treated surface by a liquid which is non-miscible with said solvent.

2. A process according to claim 1 wherein step (b) is carried out by contacting said treated surface with a liquid which causes physical removal of the residual stabilizer solution out of its position on the treated surface.

3. A process according the claim 2 wherein said liquid is water.

4. A process according the claim 1 wherein step (a) is carried out by immersing said article in said solution.

5. A process according the claim 4 wherein step (b) is carried out immediately after step (a).

6. A process according the claim 5 in which the concentration of said stabilizer in said solution is about 1 to 60% (wt/vol.)

7. A process according the claim 2 wherein said physical removal is accomplished by agitation, stirring, a jet stream or ultrasonics.

8. A process according to claim 1 wherein said article is residential siding.

* * * * *